(12) United States Patent
Bhogal et al.

(10) Patent No.: US 9,245,583 B2
(45) Date of Patent: Jan. 26, 2016

(54) GROUP CONTROL AND MESSAGING FOR DIGITAL VIDEO PLAYBACK SESSIONS

(75) Inventors: Kulvir S. Bhogal, Pflugerville, TX (US); Gregory J. Boss, Saginaw, MI (US); Rick Allen Hamilton, II, Charlottesville, VA (US); Richard Nesbitt, Holly Springs, NC (US); Brian M. O'Connell, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1305 days.

(21) Appl. No.: 12/366,726

(22) Filed: Feb. 6, 2009

(65) Prior Publication Data

US 2010/0202761 A1 Aug. 12, 2010

(51) Int. Cl.
H04N 7/16 (2011.01)
G11B 27/10 (2006.01)
H04N 21/4788 (2011.01)

(52) U.S. Cl.
CPC .............. *G11B 27/105* (2013.01); *G11B 27/10* (2013.01); *H04N 21/4788* (2013.01)

(58) Field of Classification Search
USPC ............................ 725/86–104; 715/751–759; 709/204–207
See application file for complete search history.

(56) References Cited

U.S. PATENT DOCUMENTS

| | | | |
|---|---|---|---|
| 5,808,662 A * | 9/1998 | Kinney et al. ................. | 348/14.1 |
| 6,381,608 B1 | 4/2002 | Savoie | |
| 6,625,385 B2 | 9/2003 | Collin et al. | |
| 6,675,388 B1 | 1/2004 | Beckmann et al. | |
| 7,113,773 B2 | 9/2006 | Quick, Jr. et al. | |
| 7,114,172 B2 * | 9/2006 | Lord ............................... | 725/80 |
| 7,114,173 B2 | 9/2006 | Urdang et al. | |
| 7,240,357 B1 | 7/2007 | Arsenault et al. | |
| 7,246,367 B2 * | 7/2007 | Iivonen .................. | H04N 7/165 725/101 |
| 7,386,219 B2 | 6/2008 | Ishige | |
| 7,669,219 B2 * | 2/2010 | Scott, III ......................... | 725/89 |
| 2002/0087661 A1 | 7/2002 | Matichuk et al. | |
| 2003/0016673 A1 | 1/2003 | Pendakur et al. | |
| 2003/0056220 A1 * | 3/2003 | Thornton et al. .............. | 725/62 |
| 2003/0086694 A1 | 5/2003 | Davidsson | |
| 2003/0099462 A1 | 5/2003 | Matsugami | |
| 2003/0156342 A1 | 8/2003 | Yap et al. | |
| 2003/0156827 A1 * | 8/2003 | Janevski ......................... | 386/96 |

(Continued)

*Primary Examiner* — Brian T Pendleton
*Assistant Examiner* — Dika Okeke
(74) *Attorney, Agent, or Firm* — Mitch Harris, Atty at Law, LLC; Andrew M. Harris; John R. Pivnichny

(57) ABSTRACT

Group management of video device playback provides a mechanism for shared playback of recorded video content. Digital video playback devices are linked to a central management system through network connections which manages the shared playback, or a peer-to-peer network connection is used without the central management system. One user may be responsible for all actions affecting content playback, or all users may be permitted to affect content playback, with certain actions of those users limited in type or quantity. Group membership and group member permissions can be accomplished using the digital playback device through interactive interfaces implemented by the digital video playback device, or can be accomplished using a personal computer coupled to the device or central management system. Users may comment on shared playback using interactive video-based commentary functionality that may provide a text channel or graphical images that may be selected from a set of pre-configured commentary items.

12 Claims, 6 Drawing Sheets

(56) References Cited

U.S. PATENT DOCUMENTS

| | | |
|---|---|---|
| 2003/0219228 A1 | 11/2003 | Thiagarajan et al. |
| 2004/0064689 A1* | 4/2004 | Carr .............................. 713/154 |
| 2004/0133909 A1* | 7/2004 | Ma ..................... G06Q 30/0207 725/34 |
| 2004/0151474 A1 | 8/2004 | Suh |
| 2005/0044361 A1* | 2/2005 | Chang et al. ................. 713/167 |
| 2005/0158029 A1 | 7/2005 | Irikuchi et al. |
| 2005/0246749 A1 | 11/2005 | Tsuruga et al. |
| 2006/0035610 A1 | 2/2006 | Potrebic |
| 2006/0052067 A1 | 3/2006 | Singh et al. |
| 2006/0062147 A1 | 3/2006 | Dougall et al. |
| 2006/0122946 A1* | 6/2006 | Fahrny et al. ................... 705/71 |
| 2006/0174293 A1* | 8/2006 | Ducheneaut et al. ........... 725/90 |
| 2006/0236352 A1* | 10/2006 | Scott, III ........................ 725/80 |
| 2006/0288361 A1 | 12/2006 | White Eagle et al. |
| 2007/0189708 A1 | 8/2007 | Lerman et al. |
| 2007/0199015 A1* | 8/2007 | Lopez et al. ..................... 725/31 |
| 2007/0283403 A1* | 12/2007 | Eklund et al. ................. 725/117 |
| 2008/0010372 A1* | 1/2008 | Khedouri et al. ............. 709/224 |
| 2008/0010518 A1 | 1/2008 | Jiang et al. |
| 2008/0086743 A1 | 4/2008 | Cheng et al. |
| 2008/0189380 A1* | 8/2008 | Bosworth et al. ............. 709/207 |
| 2008/0313402 A1 | 12/2008 | Wong et al. |
| 2009/0044216 A1* | 2/2009 | McNicoll .......................... 725/5 |
| 2009/0074380 A1 | 3/2009 | Boston et al. |
| 2009/0199013 A1 | 8/2009 | Raciborski et al. |
| 2009/0220216 A1 | 9/2009 | Marsh et al. |
| 2009/0263101 A1 | 10/2009 | Rudolph et al. |
| 2010/0107104 A1 | 4/2010 | Bruce et al. |
| 2011/0030012 A1 | 2/2011 | Diaz Perez |
| 2011/0321077 A1* | 12/2011 | Wang et al. ..................... 725/14 |

\* cited by examiner

GROUP CONTROL AND MESSAGING FOR DIGITAL VIDEO PLAYBACK SESSIONS

BACKGROUND OF THE INVENTION

1. Field of the Invention

The present invention is related to consumer digital video playback devices, and more particularly to methods, systems and devices in which group viewing experiences are shared by providing group control and/or messaging capabilities.

2. Description of Related Art

Digital video playback devices, such as digital video recorder (DVRs), which may be in the form of a portable device such as a personal video recorder (PVR), a set-top box or a computer having a video interface and/or video capability provided from a digital or analog network source are in widespread use in households and other locations.

DVR technology has changed the way the typical person views video programs. By allowing the recording of video content according to a schedule, a DVR makes it possible for a person to view particular content on their own schedule. DVR technology has recently been extended to provide a network interface that can communicate over public and private networks, such as the Internet. Input capabilities have been similarly extended in DVRs, giving users a greater range of interaction ability with the device. The networking and extended input capabilities have provided such features as program-guide based scheduling of DVR recording.

Many video viewing experiences are enhanced when programs are viewed in a social setting. Sporting events and weekly serial programs, for example, lend themselves particularly to group viewing because the content of these programs usually sparks commentary by and/or competition/ camaraderie between viewers. However, busy schedules and numerous commitments can make it difficult for groups to gather to view programs together.

When viewing programs in a group setting, viewers frequently manipulate prerecorded content by "pausing" live TV, rewinding, and fast-forwarding. Recently, DVR technology has provided the ability to effectively control "live" content in much the same manner. Control of the playback enhances the viewing experience in a group setting because it provides the ability to review content that has already been viewed, or skip over undesirable content, and allows for greater opportunity for each viewer to discuss the program content.

Therefore, it would be desirable to provide a method and system that allow viewers of video to collectively watch content in multiple locations while sharing the types of interaction with each other and the video program normally provided in a social setting.

BRIEF SUMMARY OF THE INVENTION

The present invention is embodied in a method, a digital video playback system, and a computer program product that carries out the method of the present invention. The computer program product may be a server application, an application executing within a playback device, or an application executed by a general-purpose computer such as a personal computer. The digital video playback system may include consumer devices such as digital video recorders (DVRs), personal video recorder (PVRs), set-top boxes, personal computers, or any other combination of devices that provide playback of video content and are connected via a network.

The method and system manage groups of digital video playback devices, providing control and optionally providing commentary between users of the devices. Multiple digital video playback devices engage in shared playback of live or previously recorded digital video content via a network. A central management system (CMS) may be employed to maintain device group identification information, synchronize content playback amongst the multiple devices, and manage each device's permissions, prescribing which actions affecting a group playback session may be performed by the device. Alternatively, control and permissions can be distributed among one or more of the devices in a peer-to-peer type network. Playback may be initiated by a single leader device, which is responsible for managing the content displayed through the shared playback. Alternatively, a cooperative viewing experience may be provided, in which each participating device has the ability to manipulate the playback of video on the other group member devices. Permissions assigned to each device may prescribe which particular manipulations may be performed. Optionally, discussion between device users may be facilitated through a commentary channel, such as a text or audio channel, or using graphic-based popups that appear in conjunction with the video program.

User selection of action choices is generally performed locally, utilizing an input device such as a DVR remote control or personal computer pointing device, and may be implemented through preset device menus and navigation aids. Activity controlling device group formation, device group synchronization, and device permissions management may be implemented at a CMS, or in a peer-to-peer embodiment, synchronization and permission management may be implemented at each individual device.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

DETAILED DESCRIPTION OF THE INVENTION

The present invention relates to digital video playback devices, such as DVRs, that are networked via public or private network connections. Multiple digital video playback devices engage in shared video content playback by forming a device group. Members of the device group simultaneously play video content and one or more users can control the playback, as well as provide commentary on the playback content. A central management system may be used to manage device group creation, route synchronization actions, and manage device permissions relating to the group playback experience. Alternatively, group management functions may be distributed among the devices in a peer-to-peer network implementation.

Figure 1:
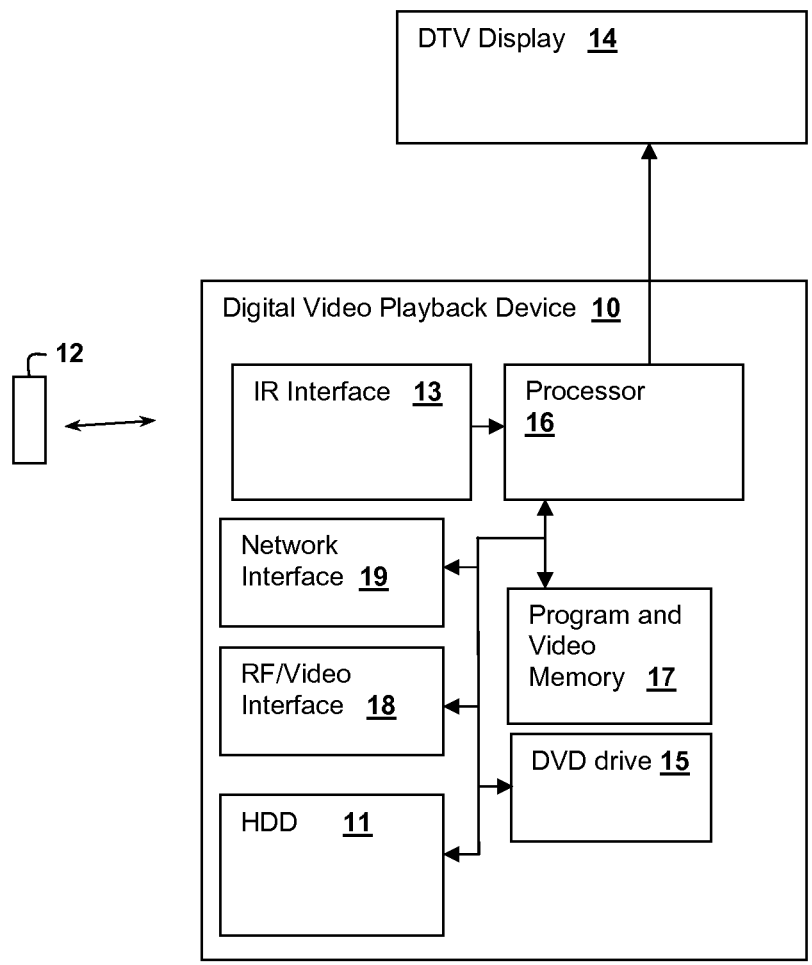
FIG. 1 is a block diagram illustrating a digital video playback device in accordance with an embodiment of the present invention.

Referring now to FIG. 1, a digital video playback device 10, in accordance with an embodiment of the invention, is shown. Digital video playback device 10 is connected to an external digital television (DTV) display 14, but digital video playback device 10 may alternatively be a portable device having an integral display. A remote control 12 is used to control operation of digital video playback device 10, in the exemplary embodiment according to methods of the present invention, in order to provide user input. However, it is understood that other user input methodologies can be employed, such as buttons and other controls integral to digital video playback device 10. Digital video playback device 10 includes an infrared (IR) interface 13 for receiving commands from remote control 12, a processor 16 for executing program instructions and also provides control and other functionality as generally associated with digital video playback device operations. A program and video memory 17 is coupled to processor 16 for storing data and program instructions, including program instructions in accordance with a computer program product embodiment of the present invention. A radio-frequency (RF)/video interface 18 receives video signals or RF signals from broadcast, closed-circuit or other video streaming sources and provides them for selection by processor 16 for ultimate display by DTV display 14. A digital versatile disc (DVD) drive 15 and hard disk drive (HDD) 11 are also included in digital video playback device 10 both for recording video program and other information. A network interface 19 provides connection to public or private networks such as the Internet, for receiving content to be recorded and later played and for communicating with remote systems and/or other devices, to provide the control and messaging features of the present invention.

Figure 2:
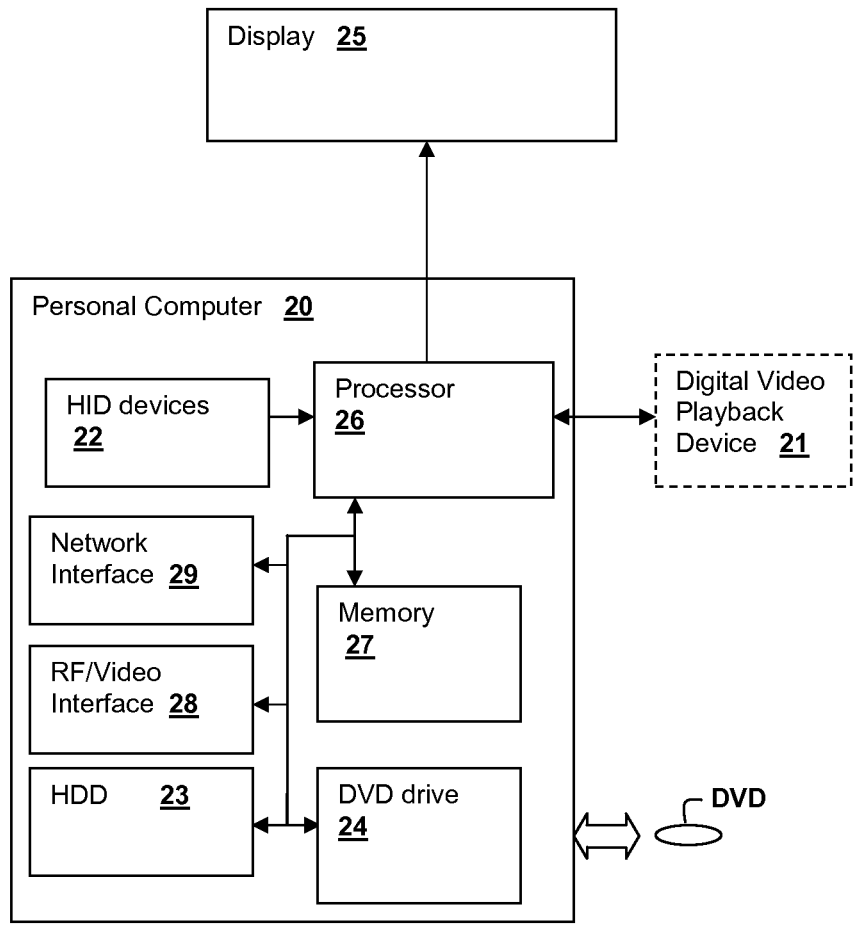
FIG. 2 is a block diagram illustrating a digital video playback device in accordance with another embodiment of the present invention.

Referring now to FIG. 2, a digital video player in accordance with another embodiment of the invention is illustrated, in the form of a personal computer system 20. The digital video player is implemented by personal computer 20, which includes a processor 26 coupled to a memory 27 for storing program instructions including program instructions for implementing a digital video player, for example by executing a third-party digital video player program. Memory 27 further includes program instructions for carrying out techniques in accordance with the present invention, which may be integrated in such digital video player program, or may be provided by a stand-alone application or plug-in that triggers video playback functions. In an alternative embodiment, a stand-alone digital video player 21, may be interfaced to personal computer 20, with an application or service within personal computer 20 providing network communication functionality and video content playback functionality by digital video player 21. The application or service program may be loaded into a computer readable storage device such as memory 27 or HDD 23 from a DVD drive 24 from a media, such as DVD disc DVD. The term "computer-readable storage device" does not encompass a propagation media. In order to receive video information from closed-circuit or broadcast sources, personal computer 20 includes an RF/Video interface 28. Network interface 29 also provides connection to public or private networks such as the Internet, for connecting to remote systems. Personal computer 20 also includes a human interface device (HID) interface 22 for connection of HIDs, such as keyboards and pointing devices. Personal computer 20 is also illustrated as connected to an external display 25. However, if personal computer 20 is a laptop, tablet or other integrated device, display 25 will generally be internal to personal computer 20.

Figure 3A:
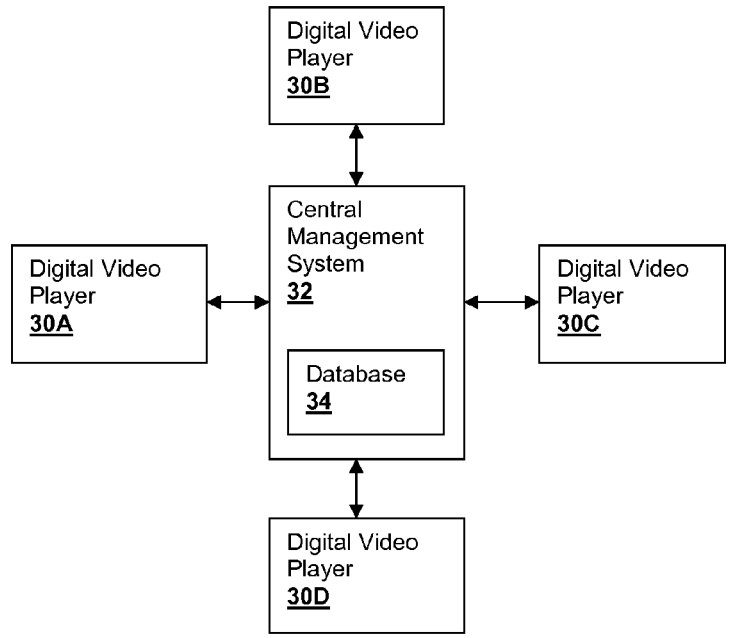
FIG. 3A is a block diagram illustrating a system in accordance with an embodiment of the present invention.

Referring now to FIG. 3A, a networked system in accordance with an embodiment of the present invention is shown. A central management system (CMS) 32 is interfaced with multiple digital video playback devices 30A-30D through an Internet connection or through another public or private network connection. Central management system 32 maintains a database 34 of group member identification and group member permissions, and also controls group creation and video playback event management. Using an input device, such as remote control 12 of FIG. 1 or HID 23 of FIG. 2, input to digital video playback devices 30A-30D initiates a message transmission that communicates group management activities and information such as group initialization, setting group member permissible actions, group member dismissal, and video playback functions to central management system 32. In response to user input designating actions to be taken controlling playback of the video content, messages are transmitted communicating the actions to central management system 32, which transmits commands to each of the digital video playback devices 30A-30D in compliance with saved permissions information. Central management system 32 monitors the playback control communications received from digital video playback devices 30A-30D and may limit the types of actions and number of times particular actions can be taken by particular users, as will be described in further detail below. Periodically during video content playback, digital video playback devices 30A-30D may issue a synchronization signal to each of the other group digital video playback devices 30A-30D to ensure that playback maintains full synchronization. If during playback one of the group digital video playback devices 30A-30D cannot continue with playback due to data corruption or any other error fatal to playback, that particular digital video playback device 30A-30D generally discontinues synchronized playback upon error, and generally does not participate in the remainder of the session unless the error can be overcome. If the error is overcome, the playback device may re-synchronize with the shared playback of the other devices.

Figure 3B:
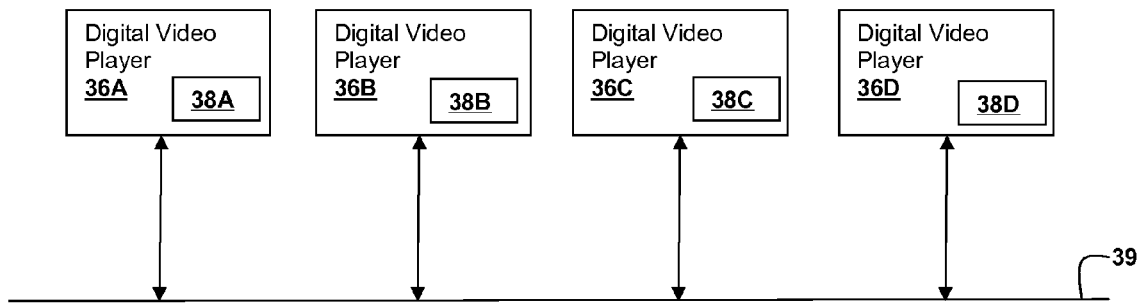
FIG. 3B is a block diagram illustrating a system in accordance with another embodiment of the present invention.

Referring now to FIG. 3B, a networked system in accordance with another embodiment of the present invention is shown. Each digital video playback device 36A-36D is networked to the others through an Internet connection or through a private network connection 39. Each digital video playback device 36A-36D maintains its own group identification and permissions information in storage within processing units 38A-38D. In response to a user input designating group creation actions and video content manipulation actions at one of the digital video playback devices 36A-36D, messages are transmitted communicating that action, and are received by each of the other digital video playback devices 36A-36D. Digital video playback devices 36A-36D may monitor allowable actions to be applied to playback that are initiated by each other user, and determine whether to apply the action locally. Periodically during video content playback, digital video playback devices 36A-36D may issue a synchronization signal to each of the other group digital video playback devices 36A-36D to ensure that playback maintains full synchronization. If during playback one of the group digital video playback devices 36A-36D cannot continue with playback due to data corruption or any other error fatal to playback, that particular digital video playback device 36A-36D generally discontinues synchronized playback upon error, and generally does not participate in the remainder of the session unless the error can be overcome. If the error can be overcome, the playback device may re-synchronize with the shared playback of the other devices.

Referring now to Table 1 below, a possible group configuration is illustrated. The information depicted in Table 1 may be maintained in storage within processing units 38A-38D, or may be maintained at central management system 23 of FIG. 3A. The information depicted in Table 1 identifies each group member device, provides a display name for use in conjunction with commentary capabilities and supplies a number of allowable actions that may be performed by each digital video playback device 30A-30D of FIG. 3A or 36A-36D of FIG. 3B. The number of allowable disruptive and non-disruptive actions may be preset or may be manually entered during group initialization. Disruptive actions include initiating playback, fast forwarding through content, and stopping content, since any of these actions may cause a viewer to miss particular video content. Pausing and rewinding content are classified as non-disruptive actions, because a viewer has an opportunity to view the entire video content. Group configuration information is accessed in order to determine permissions levels for each member device, as well as to provide identifying display names for use in conjunction with the commentary features.

TABLE 1

| Device | IP Address | Disruptive Actions | Non-Disruptive Actions | Display Name |
|---|---|---|---|---|
| A | 68.154.97.87 | 10 | 10 | Al |
| B | 68.60.199.84 | 0 | 0 | Pat |
| C | 78.137.163.91 | 0 | 0 | Chris |
| D | 68.112.149.63 | 0 | 0 | Chad |

Referring now to Table 2 below, a possible configuration of permissions is illustrated. The information depicted in Table 2 may be maintained in storage within processing units 38A-38D, or may be maintained at central management system 23 of FIG. 3A. The information depicted in Table 2 supplies identification of each group member device, and additionally supplies a number of allowable actions that may be performed by each digital video playback device 30A-30D of FIG. 3A or 36A-36D of FIG. 3B. The settings shown in Table 2 indicate that the device group is in a leader-follower mode, wherein one device is the leader device. User input received at the leader device initiates transmission of a message relaying a particular action to either CMS 23 of FIG. 3A, or to each digital video playback device 36A-36D of FIG. 3B. Each digital video playback device 30A-30D of FIG. 3A or 36A-36D of FIG. 3B will perform the actions relayed by the leader device regardless of the action's disruptive nature.

TABLE 2

| Device | IP Address | Disruptive Actions | Non-Disruptive Actions |
|---|---|---|---|
| A | 68.154.97.87 | 10 | 10 |
| B | 68.60.199.84 | 0 | 0 |
| C | 78.137.163.91 | 0 | 0 |
| D | 68.112.149.63 | 0 | 0 |

Referring now to Table 3 below, another possible permissions configuration is illustrated. Similar to the information depicted in Table 2, the information depicted in Table 3 may be maintained in storage within processing units 38A-38D, or may be maintained at central management system 23 of FIG. 3A. The settings shown in Table 3 indicate that the device group is in a cooperative mode, wherein each device may manipulate the video content. User input received at the leader device initiates transmission of a message indicating a particular action to either CMS 23 of FIG. 3A, or to each digital video playback device 36A-36D of FIG. 3B. Each digital video playback device 30A-30D of FIG. 3A or 36A-36D of FIG. 3B performs the action indicated if the particular device's allowable actions are greater than or equal to one. For example, as the information is displayed in Table 3, the user of device D may only perform one more disruptive action. Any disruptive actions performed after a count of device D's allowable actions decreases to zero may be transmitted to the CMS 32 of FIG. 3A, or to digital video playback devices 36A-36D of FIG. 3B, but will not be allowed to manipulate the video content of the device group. A disallowed group action may still be permitted manipulate the video content playback of the local device, and the local device may be re-synchronized to the shared playback upon device request, or subject to expiration of a predetermined time interval, during which the device was allowed to "leave" the group session.

TABLE 3

| Device | IP Address | Disruptive Actions | Non-Disruptive Actions |
|---|---|---|---|
| A | 68.154.97.87 | 5 | 5 |
| B | 68.60.199.84 | 2 | 5 |
| C | 78.137.163.91 | 3 | 4 |
| D | 68.112.149.63 | 1 | 3 |

The group initialization and permission-setting as described above may be performed using a personal computer, such as the personal computer described in FIG. 2 connected to the Internet via a network connection. A web browser-based interface simplifies the initialization process by providing a broader range of input capability using HID 23 of FIG. 2, which may provide a more flexible means of performing input actions than that provided by remote control 12 of FIG. 1.

Figure 4:
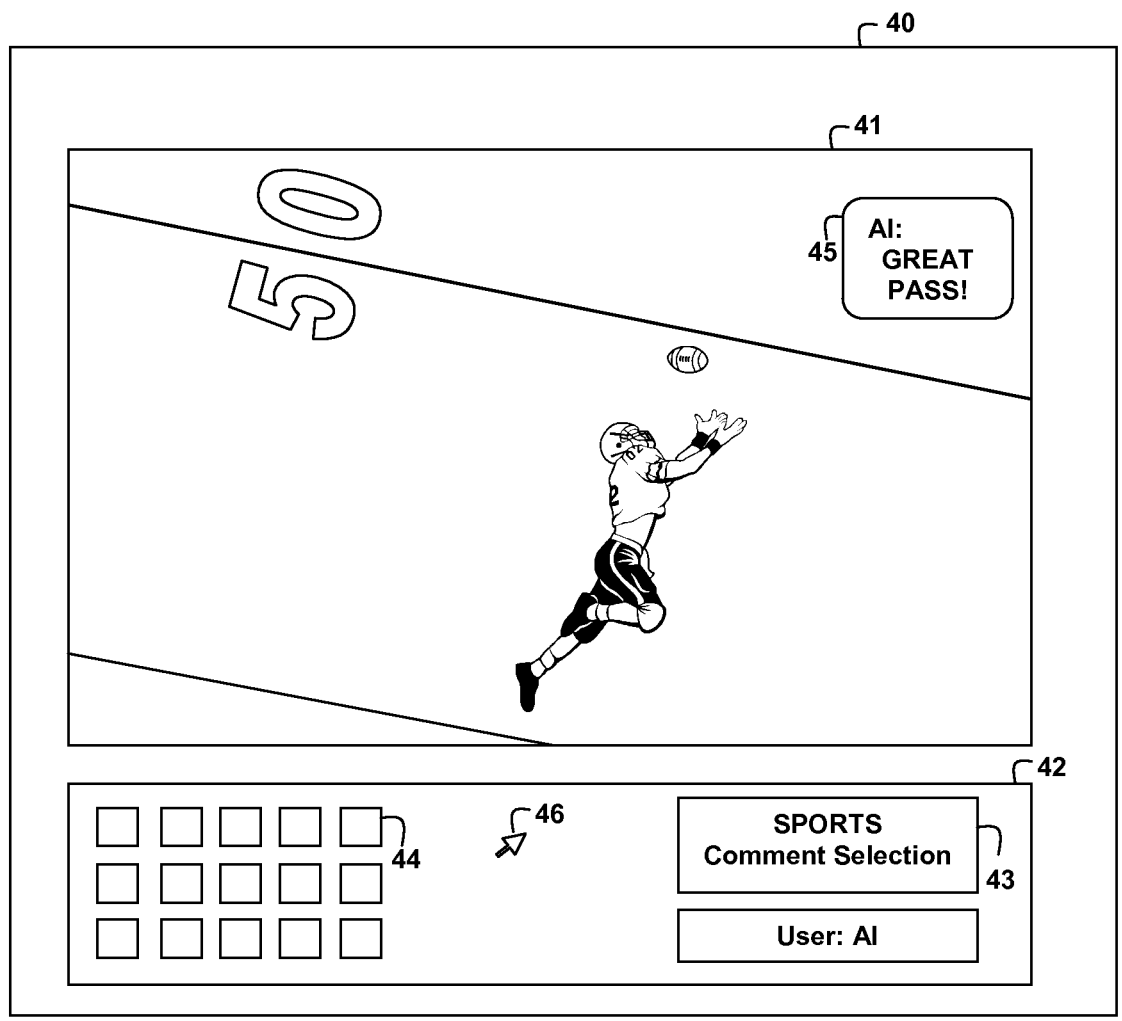
FIG. 4 is a pictorial diagram illustrating a user interface in accordance with an embodiment of the present invention.

Referring now to FIG. 4, an example of a user display and interface in accordance with an embodiment of the present invention is illustrated, showing a screen that may be presented to a user of digital video playback device 10 of FIG. 1, personal computer 20 of FIG. 2, digital video playback devices 30A-30D of FIG. 3A, or digital video playback devices 36A-36D of FIG. 3B. The user interface may be generated by program code executed by processing units contained within digital video playback devices 30A-30D of FIG. 3A, or digital video playback devices 36A-36D of FIG. 3B, using the configuration information described in Tables 1-3. User display 40 includes a video content display 41 and a commentary window 42. A topical comment guide 43 corresponds to particular video content genres (e.g., sports, drama, comedy, reality TV) and graphical comment buttons 44 provide pre-selected commentary that, when selected with cursor 46, display a comment graphic 45 appearing in conjunction with the video content display on all group member content playbacks. Pre-loaded graphical comment buttons 44 may provide genre-specific or generalized commentary. Comment graphic 45 additionally displays an identifying name for the user. FIG. 4 represents a graphic-based commentary system, but a similar text-based commentary system may be implemented using a similar interface.

Figure 5:
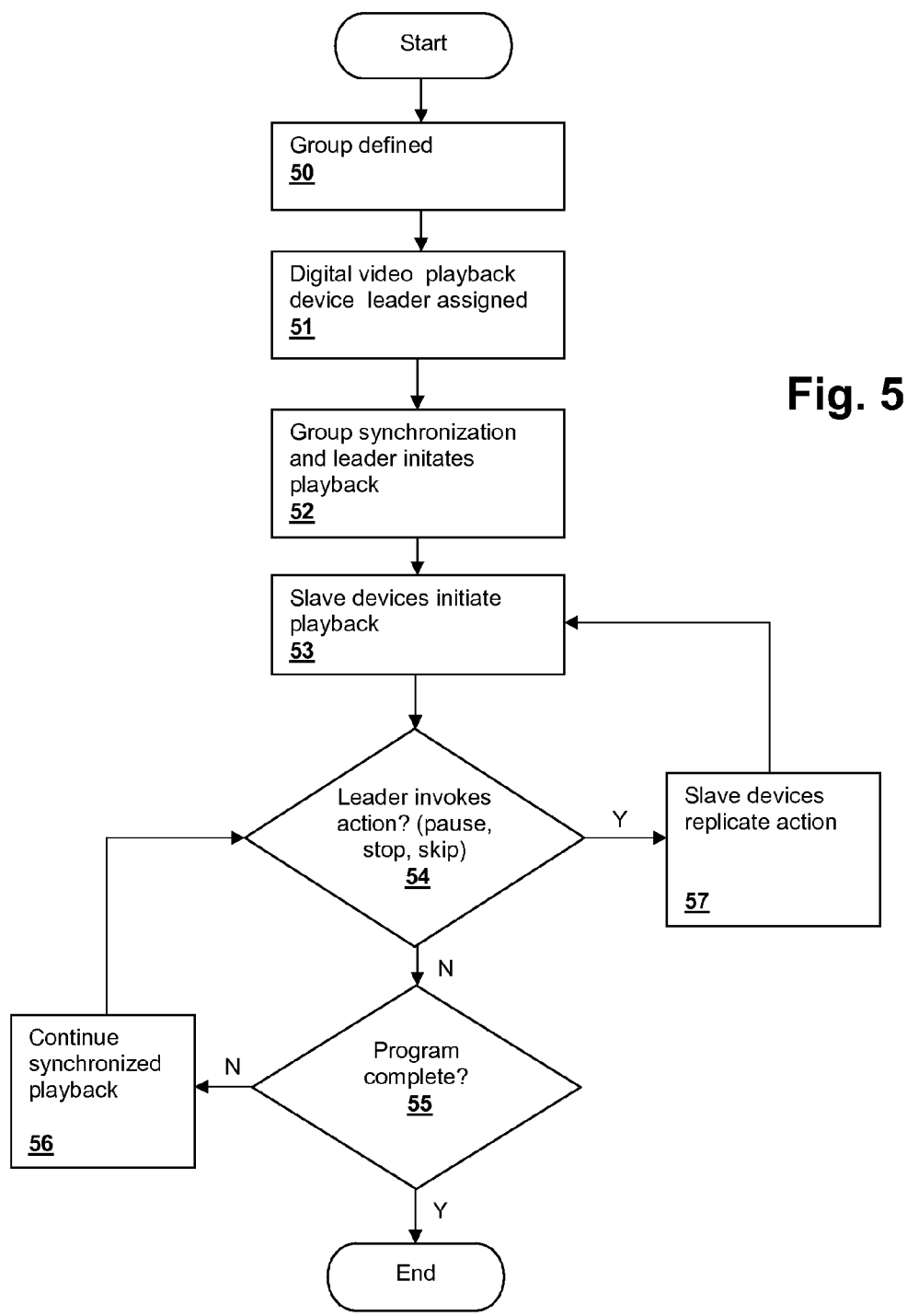
FIG. 5 is a flowchart illustrating a method in accordance with an embodiment of the present invention.

Referring now to FIG. 5, a method according to a mode of operation of a system in accordance with an embodiment of the present invention is illustrated in a flowchart. The depicted method corresponds to program code which may be locally executed in each digital video playback device that reads user input and communicates either with CMS 32 of FIG. 3A, or distributed along a peer-to-peer network, such as that illustrated in FIG. 3B. A device group is defined (step 50) using the group creation and user permission setting techniques such as those described above. A device is designated the group leader and may control all playback functionality (step 51). Input to the leader device initiates video content playback (step 52) and the group member devices are started along with the leader's playback (step 53). The playback enters a cycle where input to the leader performs an action on the playback (pause, rewind, fast forward) (decision 54). In response to input specifying an action manipulating video content playback, a message is transmitted to each slave member device relaying the direction to perform that same action on the content playback at the local machine (step 57). After the action is completed, the group devices return to synchronized play (step 53). If the leader device does not receive any content manipulation input during the content playback prior to the end of the program (decision 55), then the synchronized playback continues (step 56). The cycle of steps 53-56 is repeated until the end of the content is reached.

Figure 6:
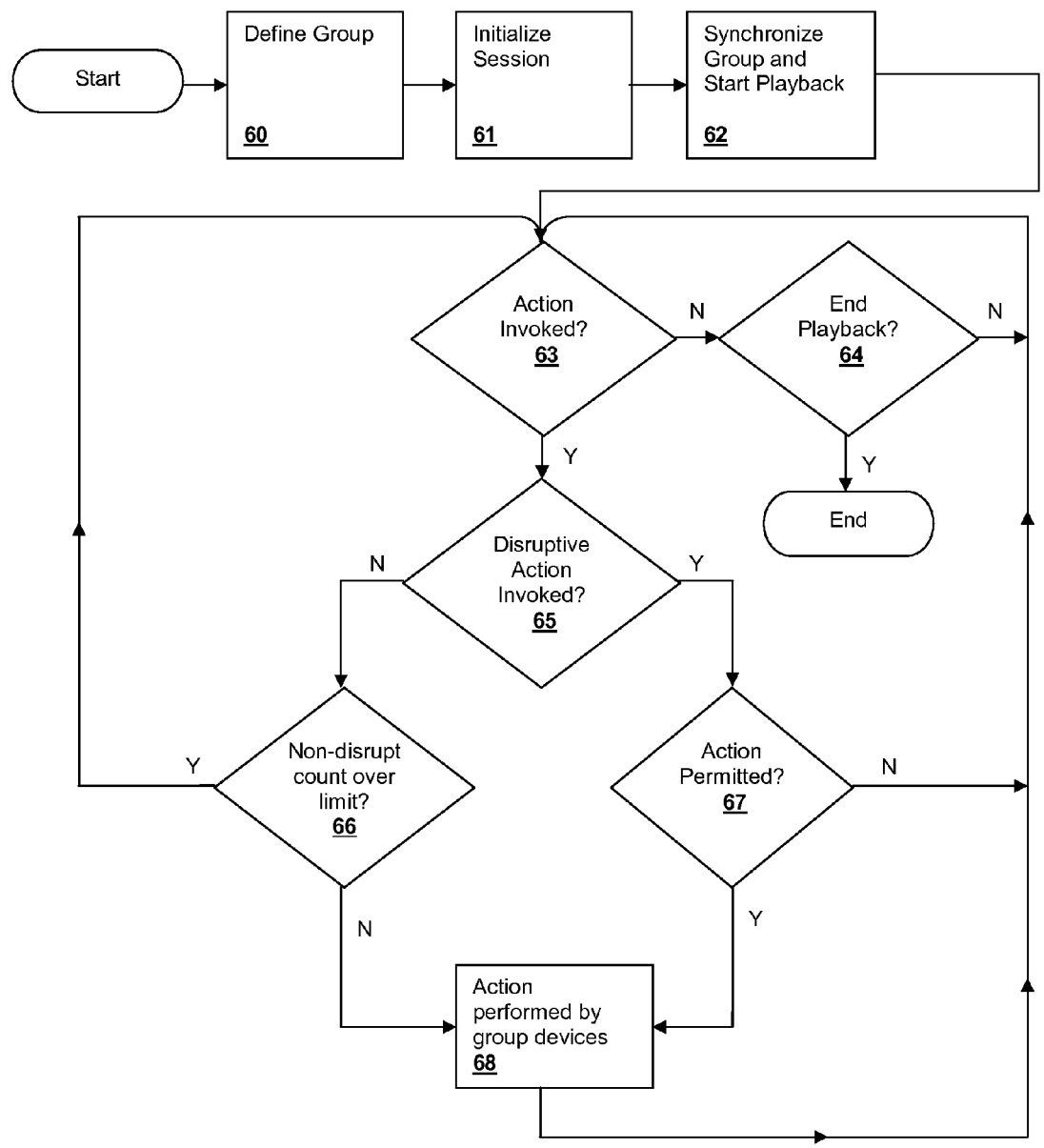
FIG. 6 is a flowchart illustrating a method in accordance with another embodiment of the present invention.

Referring now to FIG. 6, a method according to another mode of operation of a system in accordance with an embodiment of the present invention is illustrated in a flowchart The depicted method corresponds to program code which may be locally executed in each digital video playback device that reads user input and communicates either with CMS 32 of FIG. 3A or through the peer-to-peer network such as that illustrated in FIG. 3B. A digital video playback device group is defined using the techniques described above (step 60). In response to an input provided to any of the group member devices, content playback is initiated at a first device (step 61) and the group playback is synchronized and playback begins (step 62). Input provided to a group member device invokes an action (decision 63), and if that action does not end playback of the recorded content (decision 64), two different types of action processing may be performed. The action may be a disruptive action or a non-disruptive action (decision 65). Disruptive actions will cause a user to "miss" content, and include stopping and fast-forwarding video content. A user's ability to perform disruptive actions may be set in the user's permissions, or may be voted on by the group. Non-disruptive actions alter the playback of content, but will not result in a user missing content. Non-disruptive actions include rewinding and pausing video content. Each user has a predetermined number of allowed non-disruptive actions they are allowed to perform, as described above. If an input specifies an action that exceeds the number of allowable non-disruptive actions for that particular device (decision 66), the action request is denied and video content playback is unaffected. If input specifies an action within the allowable number of non-disruptive actions, then the action is synchronized to all the group member playback devices (step 68). If input specifies a disruptive action (decision 65), then the particular device's permissions are checked, or the group may be asked to vote to allow the particular action (decision 67). If the group allows the disruptive action, then the action is performed by all of the group member playback devices (step 68). After synchronization, or in the event that an action is not allowed, content playback continues until an action is invoked at any of the playback devices.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A method of managing simultaneous playback of a digital video program on a respective multiplicity of digital video playback devices, the method comprising the steps of:
  receiving from one of the digital video playback devices, a request from a user to interrupt the simultaneous playback of the digital video program at other of the digital playback devices;
  if the user has already interrupted the simultaneous playback of the digital video program at the other digital playback devices a predetermined number of times, a processor rejecting the request; and
  if the user has not already interrupted simultaneous playback of the digital video program at the other digital playback devices the predetermined number of times, the processor forwarding the request to the other digital video playback devices for execution.

2. The method of claim 1, further comprising filtering the request in conformity with permissions data specifying video manipulation actions permitted to users.

3. The method of claim 1, wherein the step of receiving receives the request at a remote server coupled to the multiple digital video playback devices via a network, and further comprising the step of maintaining a database of playback device data at the remote server, and wherein the database includes multiple playback device identification data and multiple playback device permissions data corresponding to the multiple digital video playback devices.

4. The method of claim 1, wherein the step of receiving receives the request at the at least one other one of the multiple digital video playback devices, and wherein the method further comprises maintaining a database of playback device data at the at least one digital video playback device, wherein the database includes multiple playback device identification data and multiple playback device permissions data corresponding to the multiple digital video playback devices.

5. A system for managing simultaneous playback of a digital video program on a respective multiplicity of digital video playback devices, the system comprising:
  a processor, a computer-readable memory and a computer-readable tangible storage device;
  program instructions, stored on the storage device for execution by a processor via the memory, to receive a request from a user to interrupt the simultaneous playback of the digital video program at other of the digital playback devices;
  program instructions, stored on the storage device for execution by a processor via the memory, to reject the request if the user has already interrupted the simultaneous playback of the digital video program at the other digital playback devices a predetermined number of times; and
  program instructions, stored on the storage device for execution by a processor via the memory, to forward the to the other digital video playback devices for execution if the user has not already interrupted the simultaneous playback of the digital video program at the other digital playback devices a predetermined number of times.

6. The system of claim 5, further comprising program instructions to filter the request in conformity with permissions data specifying video manipulation actions permitted to individual members of a group of users, wherein the program instructions to forward the request to the other digital video playback devices forward the request in conformity with a result of executing the program instructions to filter the message.

7. The system of claim 5, further comprising program instructions to maintain a database of playback device data at the remote server, and wherein the database includes multiple playback device identification data and multiple playback device permissions data corresponding to the multiplicity of digital video playback devices.

8. The system of claim 5, wherein the system further comprises program instructions to maintain a database of playback device data at the at least one of the multiplicity of digital video playback devices, and wherein the database includes multiple playback device identification data and multiple playback device permissions data corresponding to the multiplicity of digital video playback devices.

9. A computer program product for managing simultaneous playback of a digital video program on a respective multiplicity of digital video playback devices, the computer program product comprising:
   a computer-readable tangible storage device;
   program instructions, stored on the storage device, to receive a request from a user to interrupt the simultaneous playback of the digital video program at other of the digital playback devices;
   program instructions, stored on the storage device, to reject the request if the user has already interrupted the simultaneous playback of the digital video program at the other digital playback devices a predetermined number of times; and
   program instructions, stored on the storage device, to forward the to the other digital video playback devices for execution if the user has not already interrupted the simultaneous playback of the digital video program at the other digital playback devices a predetermined number of times.

10. The computer program product of claim 9, further comprising program instructions, stored on the storage device, to filter the request in conformity with permissions data specifying video manipulation actions permitted to individual members of the group of users, and wherein the forwarding the request to the other digital video playback devices is performed in conformity with a result of the filtering.

11. The computer program product of claim 9, further comprising program instructions, stored on the storage device, to maintain a database of playback device data at the remote server, and wherein the database includes multiple playback device identification data and multiple playback device permissions data corresponding to the multiplicity of digital video playback devices.

12. The computer program product of claim 9, further comprising program instructions, stored on the storage device, to maintain a database of playback device data at the at least one of the multiplicity of digital video playback devices, and wherein the database includes multiple playback device identification data and multiple playback device permissions data corresponding to the multiplicity of digital video playback devices.

* * * * *